(12) United States Patent
Kepler et al.

(10) Patent No.: US 6,565,644 B2
(45) Date of Patent: May 20, 2003

(54) MICRO-ENCAPSULATED CRACK RESISTANT CEMENT

(75) Inventors: William F. Kepler, Golden, CO (US); Kurt F. von Fay, Morrison, CO (US)

(73) Assignee: The United States of America as represented by the Secretary of the Interior, Washington, D.C.

( * ) Notice: Subject to any disclaimer, the term of this patent is extended or adjusted under 35 U.S.C. 154(b) by 3 days.

(21) Appl. No.: 09/891,452

(22) Filed: Jun. 27, 2001

(65) Prior Publication Data

US 2003/0000425 A1 Jan. 2, 2003

(51) Int. Cl.⁷ ................................................ C04B 24/24
(52) U.S. Cl. ...................................... 106/713; 106/724
(58) Field of Search ........................ 206/219; 106/713, 106/724, 696

(56) References Cited

U.S. PATENT DOCUMENTS

| | | | | |
|---|---|---|---|---|
| 4,096,944 A | * | 6/1978 | Simpson | 206/219 |
| 4,352,693 A | * | 10/1982 | Langdon | 206/119 |
| 4,362,566 A | * | 12/1982 | Hinterwaldner | 523/219 |
| 4,534,795 A | * | 8/1985 | Lewis et al. | 405/261 |
| 4,772,326 A | * | 9/1988 | Heinen et al. | 206/219 |
| 4,802,922 A | * | 2/1989 | Smart | 405/261 |
| 6,348,093 B1 | * | 2/2002 | Rieder et al. | 106/724 |
| 6,350,304 B1 | * | 2/2002 | Tozaka | 106/724 |

* cited by examiner

*Primary Examiner*—Paul Marcantoni
(74) *Attorney, Agent, or Firm*—Carla Mattix

(57) ABSTRACT

A cement mixture is provided for preventing or reducing the formation of micro-cracks during hydration. The cement mixture includes both a conventional cement and a cement micro-encapsulated in a time-release polymer coating. The micro-encapsulated cement does not hydrate until a few hours to a few days after the bulk of the conventional cement has hydrated, thereby allowing for autogenous healing of small cracks.

12 Claims, No Drawings

MICRO-ENCAPSULATED CRACK RESISTANT CEMENT

FIELD OF THE INVENTION

The present invention relates to cement mixtures which prevent or reduce the formation of micro-cracks and, more particularly, to an improved cement mixture of a conventional cement and a cement that is micro-encapsulated in time-release polymer coatings.

RELATED ART

Concrete made with conventional cements has a tendency to crack. Great care must be taken in the mixture formulation, joint design, and steel reinforcement design to minimize the chances of detrimental cracks developing. It will be appreciated that joints and steel reinforcement add substantial cost to the concrete application. Although additives such as chemical and mineral admixtures and plastic and metal fibers have often been used in concrete to minimize cracking, these can add considerably to the cost of the concrete.

Patents of interest in this field include the following U.S. Pat. Nos. 5,639,298 (Miller et al.); 4,069,063 (Ball); 4,419,136 (Rice); and 5,728,209 (Bury et al). Briefly considering these patents, the Miller et al patent discloses a composition for controlling the setting time of cements, the composition including a sulphate component modified by the inclusion of magnesium sulphate in an amount of from about 0.5 to about 12% by weight. The Ball patent discloses a composition for controlling the setting time of cements wherein carbon dioxide is added to the cement mixture in an amount from about 0.1% to about 6.0% by weight. The carbon controls the setting time and stabilizes the hydrated products. The Rice and Bury et al patents relate to additives used with cements.

SUMMARY OF THE INVENTION

According to the invention, there is provided an improved cement mixture for preventing or reducing the formation of micro-cracks in a concrete structure, the cement mixture comprising a conventional portland cement and a second cement which is micro-encapsulated in a time-release polymer coating so the second cement does not hydrate for at least a few, i.e., about three, hours after the bulk of the conventional cement is hydrated so as to provide autogenous healing of small cracks in the concrete structure.

The second cement, i.e., the cement which is micro-encapsulated in the time-release polymer coating, is preferably portland cement (like the first cement) or expansive hydraulic cement. The amount of cement which is micro-encapsulated in the time-release polymer coating in the mixture is preferably between 10% to 50% of the total mixture. In a more preferred embodiment, the mixture comprises 10% micro-encapsulated cement and 90% conventional portland cement.

Other features and advantages of the invention will be set forth in, or apparent from, the following detailed description of the preferred embodiments of the invention.

DESCRIPTION OF THE PREFERRED EMBODIMENTS

As indicated above, according to the invention, there is provided a cement mixture for preventing or reducing the formation of micro-cracks in concrete structures. The cement includes a mixture of (i) a first, conventional (e.g., portland) cement and (ii) a cement that is micro-encapsulated in a time-release polymer coating. The time-released micro-encapsulated cement does not hydrate until at least about three hours to a few days after the bulk (i.e., at least over one half thereof) of the conventional cement has hydrated. As a result, the micro-encapsulated cement allows for autogenous healing of small cracks that being to form during hydration. In addition, the use of micro-encapsulated cement reduces the joint and steel reinforcing requirements related to concrete shrinkage.

The time-released micro-encapsulated cement employed in the cement mixture of the invention can comprise one of several types of portland cement or expansive hydraulic cement, depending on the specific application. The American Society for Testing and Materials (ASTM) has divided portland and expansive hydraulic cement into different types and has defined standards for each Type. Portland cement is divided into five Types based on the maximum concentrations of certain chemical constituents. Expansive hydraulic cement is divided into three Types based on the presence of various calcium compounds.

For many applications of the present invention, ASTM Type I portland cement is suitable for encapsulation. In applications requiring some sulfate resistance, ASTM Type II portland cement is suitable, whereas however for highly aggressive sulfate conditions, ASTM Type V is preferred. ASTM Type III portland cement is used when rapid strength gain is required, while ASTM Type IV may be used when slower strength gain is acceptable. Expansive hydraulic cements are preferred for encapsulation when control of cracking is critical.

The encapsulation time-release coating for the cement can be selected from a number of different suitable polymers possessing the required properties. In this regard, the coating must be able to prevent hydration of the encapsulated cement until the appropriate period of time has elapsed. In addition, the coating must be able to withstand a very high pH environment for a minimum of six hours. As stated, a number of candidate polymers possess these properties.

The conventional cement, used in combination with the encapsulated cement, is preferably portland cement. The ASTM Type of portland cement is selected based on the requirements of the specific application. Preferably, ASTM Type I, II, III, or V portland cement is used.

The preferred amount of time-release micro-encapsulated cement is from 10% to 50% by weight of the total mixture. The most preferred mixture contains 10% encapsulated cement and 90% conventional cement, by weight.

Although the invention has been described in detail with respect to preferred embodiments thereof, it will be apparent to those skilled in the art that variations and modifications can be effected in these embodiments without departing from the spirit and scope of the invention.

What is claimed is:

1. A cement mixture comprising:
   a first cement, selected from the group consisting of Portland cement and expansive hydraulic cement, that, in use, is hydrated for a time effective so that at least more than one half of said first cement is hydrated;
   and a plurality of micro-capsules mixed with said first cement,
      said micro-capsules comprising a second cement, selected from the group consisting of Portland cement and expansive cement, which is microencapsulated in a time-release polymer coating so as to delay hydration of said second cement for at least three hours after said first cement is hydrated for said time effective so that at least more than one half thereof is hydrated.

2. The cement mixture according to claim 1 wherein said first cement comprises portland cement.

3. The cement mixture according to claim 1 wherein said first cement comprises expansive hydraulic cement.

4. The cement mixture according to claim 1 wherein said second cement comprises portland cement.

5. The cement mixture according to claim 1 wherein said first cement is present in an amount by weight from 10% to 50%.

6. The cement mixture according to claim 2 wherein said portland cement comprises ASTM C150-95a Type I cement.

7. The cement mixture according to claim 2 wherein said portland cement comprises ASTM C150-95a Type II cement.

8. The cement mixture according to claim 2 wherein said portland cement comprises ASTM C150-95a Type IV cement.

9. The cement mixture according to claim 2 wherein said portland cement comprises ASTM C150-95a Type V cement.

10. The cement mixture according to claim 3 wherein said expansive hydraulic cement comprises ASTM C845-96 Type M cement.

11. The cement mixture according to claim 3 wherein said expansive hydraulic cement comprises ASTM C845-96 Type K cement.

12. The cement mixture according to claim 3 wherein said expansive hydraulic cement comprises ASTM C845-96 Type S cement.

* * * * *